United States Patent

[11] 3,613,599

[72] Inventor Solomon H. Seidman
 2021 Meridian Ave., Miami Beach, Fla. 33139
[21] Appl. No. 739,122
[22] Filed June 21, 1968
[45] Patented Oct. 19, 1971

[54] GROUND TRANSPORATION SYSTEMS
 11 Claims, 14 Drawing Figs.
[52] U.S. Cl. ............................................. 104/18,
 104/20, 104/138, 104/168
[51] Int. Cl. ........................................ B61b 13/10,
 B61b 13/12
[50] Field of Search .......................................... 104/18, 20,
 138, 147, 148, 155, 168

[56] References Cited
UNITED STATES PATENTS
| | | | |
|---|---|---|---|
| 3,249,065 | 5/1966 | Adams | 104/168 X |
| 3,404,638 | 10/1968 | Edwards | 104/138 X |
| 3,412,689 | 11/1968 | Hawes | 104/148 X |
| 3,438,337 | 4/1969 | Edwards | 104/155 X |
| 3,412,690 | 11/1968 | Broggie | 104/168 |

FOREIGN PATENTS
| | | | |
|---|---|---|---|
| 1,370,670 | 7/1964 | France | 104/168 |
| 1,167,872 | 4/1964 | Germany | 104/168 |

*Primary Examiner*—George E. Lowrance

ABSTRACT: Systems of high-efficiency, continuous, electric-powered transportation for urban areas comprise a plurality of the following systems in various combinations:
 (a) Dependable, continuous transportation is attainable by ever-accessible, external systems of continuous propulsion of individual and multisection vehicles by imparting successive impulses thereto. (b) The propulsion systems and three-dimensional guiding systems include resiliently yielding components of downward-directed pressure, serving to maintain positive, adequate traction between the driving-guiding systems and the tractional surfaces on successive vehicles for their propulsion at widely ranging operative speeds including speeds designed to propel vehicles buoyantly above ground. (c) Automatic timing systems operative to maintain the successive vehicles on headway time measurable in seconds, serve to provide ever-ready availability of transport. (d) Continuous loading systems include continuous, speed-adjusting load transfer systems in temporarily unitary relation with successive vehicles on short headway time, adjustability of loading speed establishing transport capacity of the systems. (e) Aerodynamic control systems serving to minimize head-on air resistance to movement of vehicles operative to aircraft speeds, comprise all-weather inclosure whose cross section varies inversely to vehicle speed change and embodies air passage for eliminating differential of pressure between air masses between vehicles. (f) All-electric automobile transport in a wide range of highway speeds and distances beyond stored power capability of electric automotive vehicles, is attainable in combination with the external, electric propulsion systems as in (a) and electric generator in each vehicle restoring the automotive power capacity while powered from vehicle propelled externally.

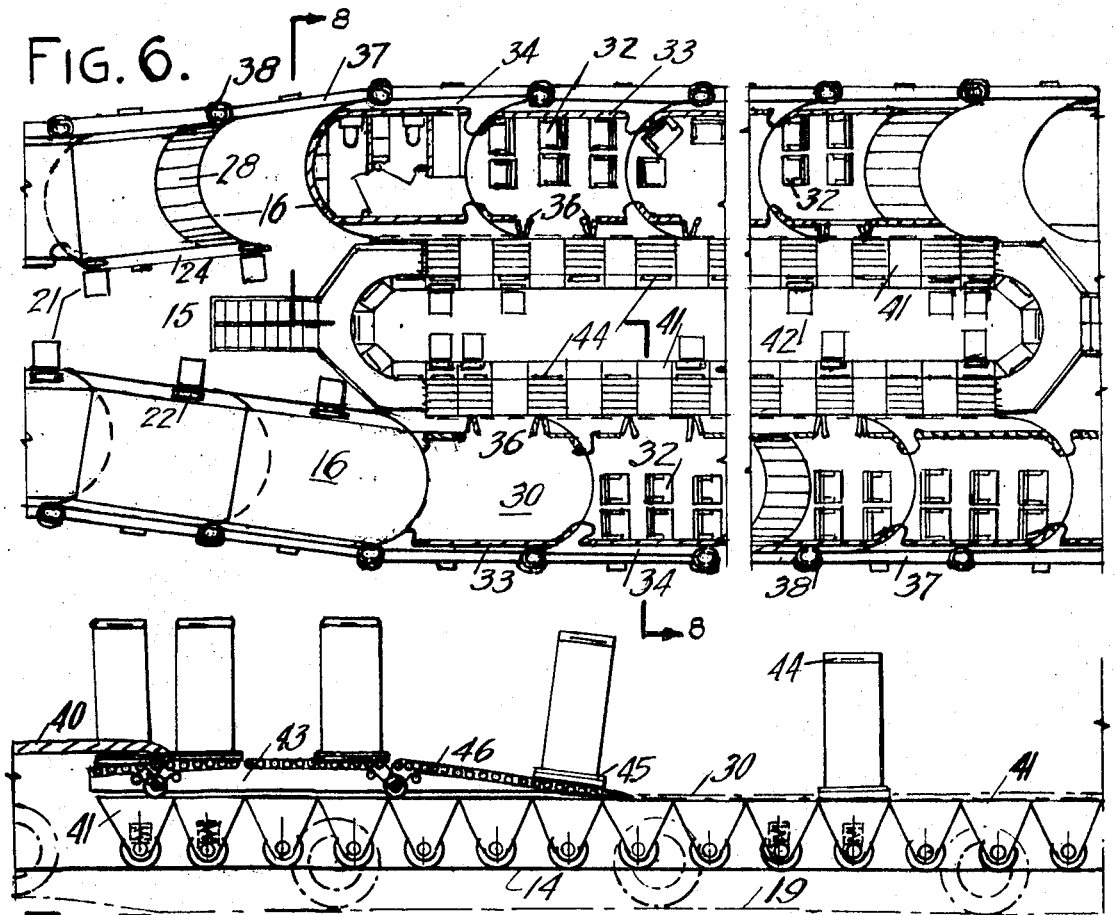
FIG. 6.
FIG. 7.
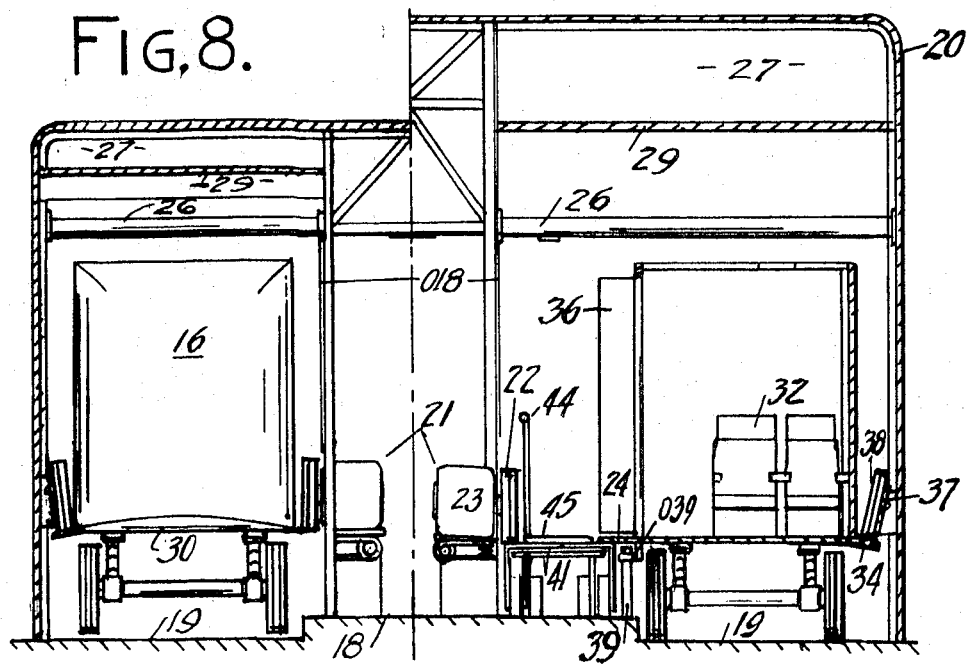
FIG. 8.

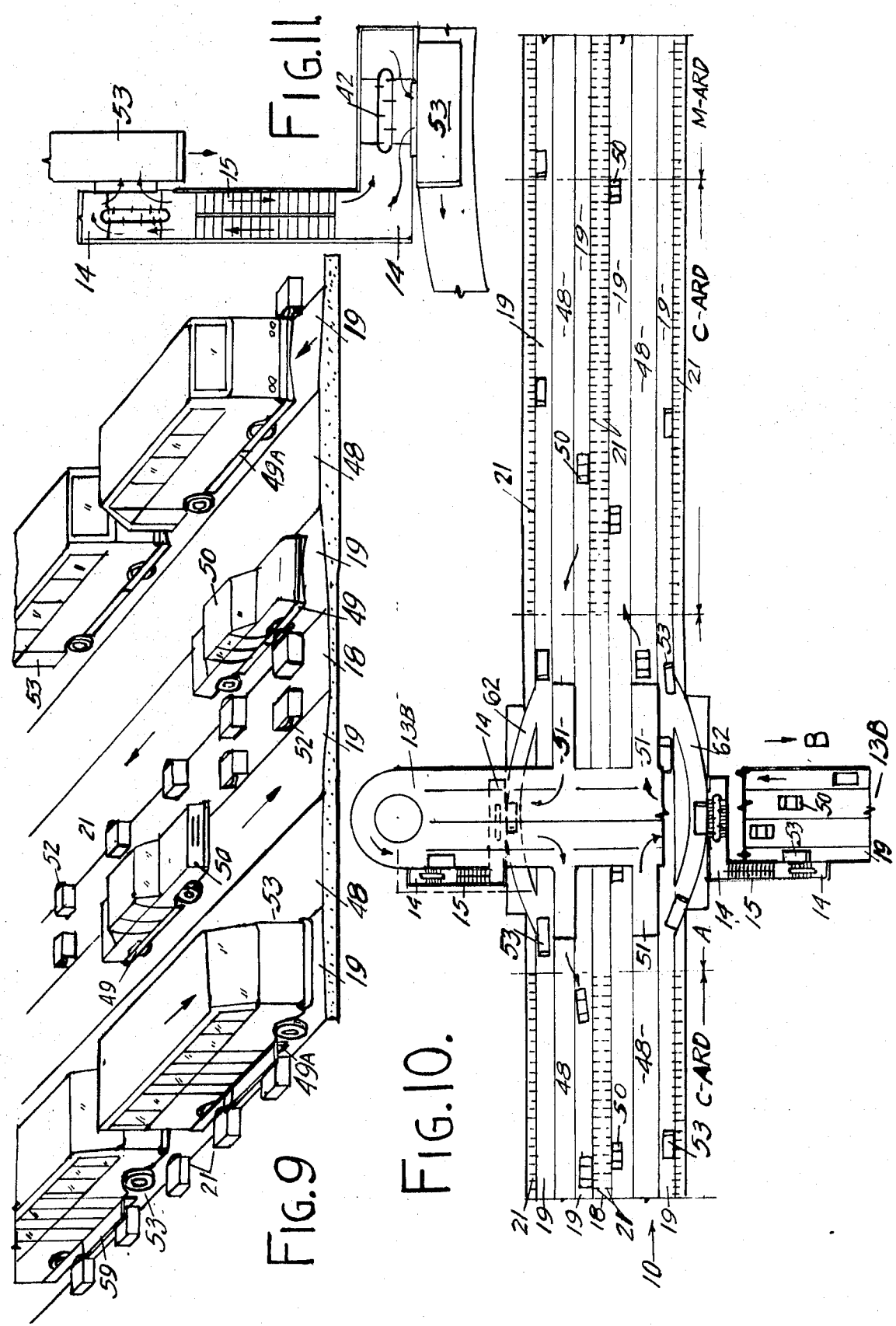

GROUND TRANSPORATION SYSTEMS

Increasing concentrations of massed automobiles require new, generic improvement in public and private ground transportation within and between neighboring urban area centers. The basic need is a system of transportation that attains significant increase in the efficiency of transportation, including:

I. Practical alternative to vehicular traffic congestion;
II. Practical alternative to air-polluting drives;
III. Virtual elimination of prevailing danger and high rate of serious highway accidents that are inherent in masses of speeding vehicles under control of motorists who differ in ability, temper, judgment and physical condition.

All of the cited needs can be met practically and economically by means of continuous, electric-powered, public transportation that is self-liquidating under moderate usage, and by all-electric, dual propulsion of automotive vehicles. The improvements in systems of successive impulse type, (guided and unguided) plus dual propulsion of vehicles, embody mass-producible, well-known components that are not experimental in combination, but are practical and novel.

Traffic congestion may be virtually eliminated only by improved public transportation that offers adequately counterbalancing incentives attractive to the motorist for specific trips, as a. immediate transport availability at all times;
b. uninterrupted transportation to his destination;
c. dependably reduced duration and cost of desired trips;
d. roomy seating and comfort for all passengers at all times.

The motorist values his auto for these advantages, but traffic congestion nullifies (b) and (c), whereas continuous public transit assures that (a), (b), (c) and (d) prevail at all times.

Immediate transport availability cannot be attained by loading at standstill, for such method necessitates headway and reduction of headway to its desirable minimum by prevailing means, and is prohibitively expensive. Also, frequent standstill loading on routes of closely spaced stations, reduces effective speed substantially. However, replacing standstill loading by continuous loading/unloading during continuous transport, inherently enables reduction of headway to insignificance, while the resulting effective speed is increased by loading/unloading during vehicle movement at low station speed followed by transport at high interstation speed.

Dual propulsion of electric automotive vehicles enables unlimited operation at desirable highway speeds without air pollution, highway hazards also being avoided by virtue of dual propulsion.

The foregoing summary needs indicate the general scope of the objects of this invention, of which the primary object is to increase the efficiency of transportation and of operation significantly in systems of guided and unguided public and private transportation in urban areas.

A general object is to meet the needs of alternatives to traffic congestion, air pollution and road hazards listed as I, II, and III.

Another object is the improvement in public rapid transit to attain not only equality but also advantage over the private auto, particularly for commuting to and from business centers.

An important object is integration of competitive or coordinating systems of transportation, plus ready availability and continuity of transfer, serving to reduce time of trip to minimum.

Other objects relate to novel improvements to attain the above and other objects. One such object is economical, trouble-free, fully automatic vehicle propulsion means that is operative continuously from the side of operatively disposed vehicles on a road and that is arranged to impart frequent successive impulses at different speeds to each vehicle in succession, thereby achieving continuous vehicle movement at correspondingly changing speeds.

Another object is to supersede prevailing automotive drives by electric dual propulsion means; first, to replace fuel-burning automotive drives by electric power drives; second, to supplement the electric automotive drives by automatic, electric roadside propulsion for faster highway speeds and for longer trips than is possible by electric automotive drives; third, to regenerate the automotive electric power source during the roadside propulsion.

Among the objects is an automatic system of frequent successive impulses imparted to vehicles for their propulsion between minimum and maximum speeds; enabling movement of a plurality of vehicles in immediate succession at the same minimum speed while passing each station to achieve continuous loading and unloading, and automatic speed-adjusting load transfer system at each station serving to transfer load to and from vehicles passing stations at minimum speed, thus serving to provide automatic, public transit by stationary electric means.

Objects include avoidance of air turbulence and reduction of air resistance to virtual insignificance at all speeds; also substantial reduction of vehicle weight per passenger seat.

Other objects are adaptation of electric automotive vehicles and highways for dual electric propulsion of private automobiles, limousines and light delivery trucks as well as of buses for highway rapid transit including offroad loading; also adaptation of electric automotive buses and city street curbing for dual electric city street bus systems interlocked with traffic lights at crossings for continuous passenger loading and transport automatically.

Not least is the object of continuous transfer between pairs of stations of continuous loading and transportation systems as means of integration into a comprehensive urban transportation system of high efficiency.

These and other objects are attained in the preferred illustrative embodiments described in the specification and the drawing forming part thereof. In the drawing:

FIG. 6 is a plan view of a loading/unloading system at a station and oppositely directed vehicles of a public transit system.

FIG. 7 is a partial elevation showing a modified loading system; the vehicle platform and wheels also road being in dot and dash lines.

FIG. 8 is a cross section of the system substantially on line 8—8 in FIG. 6 but within an improved enclosure; a train elevation at left of center is in a section through a changing speed zone and at right is a section at a station.

FIG. 9 is a perspective of a highway with roadside drives and vehicles.

FIG. 10 shows a highway and crossing plus offroad bus loading/transfer.

FIG. 11 is an enlargement of portion in FIG. 10 within dot-dash line.

Figure 1:
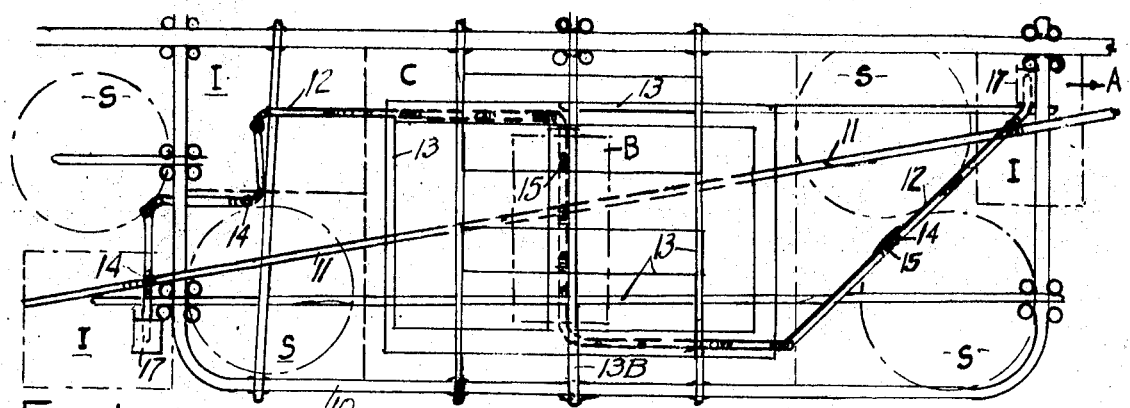
FIG. 1 represents schematically a plurality of integrated component systems of continuous public and private transportation in an urban metropolitan area.

On conventional transit systems, headway is inherently necessary and it is often considerable for economy reasons. Thereby it causes reduction in 'net effective speed' to significant disadvantage with the private auto whose ready availability causes headway to be zero. 'Net Effective Speed' applied to public transportation includes headway as a proper charge in speed calculations. This enables equitable comparison to be made among the various modes of land transportation on a basis that includes the important factor of ready availability. In the improved, continuous public transit system described herein, headway is controllable to the insignificance of a few seconds, thereby achieving the highest net effective speed for any maximum running speed.

In this system of transportation on roads having vehicles thereon, an important advance in the art of propelling the vehicles is propulsion means disposed along the roadside, in operative relation to the vehicles, for imparting frequent successive impulses to each section of the vehicles for their continuous movement at desirable speeds. The preferred means is a series of stationary drives so spaced operatively alongside the vehicle route, as to propel each vehicle automatically in continual succession from the side thereof at constant or variable speeds. For by presetting the speeds of spaced drives progressively faster or slower, corresponding changes are effected upon vehicle speeds. Thereby, successive vehicles such as trains of cars in a public transit route are propelled at any practical interstation speed and suitably slowed then speeded from and to stations. Yet every individual drive unit serves to operate at its preset, constant speed continuously, hence at optimum efficiency. The stationary drives are always accessible for examination and servicing without affecting continuity of the system's operation, so that it can be depended upon at all times.

The frequent succession of impulses imparted continuously to vehicles by roadside drives operative at different speeds and the resulting continuous movement of the transporting vehicles enable substantial improvements and important advantage to be embodied in this novel system of transportation as follows: As vehicle speeds are increased, increasing numbers of successive drives are operative at no load, so that 'rest periods' become proportionately more substantial, drive time being part of a second in perhaps 10 seconds. With light wear on tires and bearings, their life lasts considerably even at high speeds. Yet each vehicle section has a drive propelling it at all times. Efficiency of operation is further enhanced by continuous roadside propulsion, since operating costs are affected by the extent of 1. vehicle acceleration, 2. wind resistance and 3. vehicle weight.

1. Continuous roadside propulsion enables acceleration of vehicles of limited wheel loads between suitable minimum and desirable maximum speeds by a series of stationary drives of uniform, small power and of uniform, short spacing, imparting increasingly frequent impulses in succession. For the number of drives during each second of constant acceleration and the incremental power deliverable to vehicles varies as the operating speed while the energy of acceleration stored in the vehicles increases as the square of the velocity. The installed capacity per mile of transportation serves to propel a continual succession of many vehicles per day, enabling self-liquidating operation even under moderate usage.

2. Head-on wind pressure against speeding vehicles increases as the square of the speed. Hence the power to overcome it conventionally increases as the pressure times the velocity, i.e. as the cube of the speed. But the incremental power requirement in each second of continuous roadside propulsion increases also as the square of the speed. However, continuous roadside propulsion of vehicles within an aerodynamically improved enclosure, wind resistance is reduced to virtual insignificance at any speed of operation and important advantages result, as will be evident from the description of the improvement hereinafter.

3. Because operating costs of transportation are almost proportional to the gross vehicle weight, significant advantage accrues from weight reduction made possible by virtue of continuous roadside propulsion, such as:
  a. avoiding transport of braking equipment and drives;
  b. lighter design weight made possible in avoiding standstill loading and the resulting stresses imposed in overcoming standstill inertia;
  c. replacing conventional heavy bodies designed to withstand weather and wind resistance by lightweight, preferably roofless bodies on vehicles operative in an enclosure such as of reference in par. 2.

Vehicles of reduced weight as above are designated as 'lightweight' in differentiation from other weight savings as in fabrication.

Illustrated schematically in FIG. 1 are several systems of all-electric transportation in a preferred arrangement within an urban area having city and suburban residential districts C and S, as well as business and industrial centers B and I. These systems which include three categories of continuous public transportation 11, 12 and 13 and a peripheral highway 10 that provides electric roadside propulsion for electric autos, are integrated for continuous interchange of load between them, to form a comprehensive transportation system. Routes 10 and 11 pass airport A between cities.

Route 11 represents a high speed system such as may serve in an intercity corridor. Its maximum speed may be substantially in excess of 300 ft. sec. In a generally ground level route averaging perhaps five stations per 200 miles, the continuous 'net effective speed' will be in excess of 160 miles per hr. — 1 hr. 9 min. vs. 1 hr./200 mi. the maximum running speed. Route 12 of perhaps 100–150 f.p.s. maximum speed, represents a combination aerial and subway rapid transit system serving the metropolitan area. Routes 11 and 12 are closed dual-track routes. Routes 13, also closed, provide city street public transit of perhaps 50-f.p.s. maximum speed. The figures and arrangement are of course illustrative only.

Each of the public systems has spaced stations 14 which communicate continuously between routes 11 and 12 and between 12 and 13 by continuously operative electric stairs as at 15 for continuity of transfer therebetween. Also there are entrances and exits along highway 10 to and from thoroughfares and parking provision at stations in the several residential districts and industrial centers. These are best negotiated by electric automotive means. Station spacings on the high-speed intercity system 11 may be on the order of 5 mi. to 50 miles. Station spacings on 12 would range perhaps 2 to 5 mi. in sparse suburban districts to a preferred minimum of 1 mile in dense city residential and business districts. Auxiliary transit support such as systems 13 provide as close station spacing as is deemed desirable; thus there is assured easy accessibility to all systems and thereby to any desired destination by continuous transit.

Figure 2:
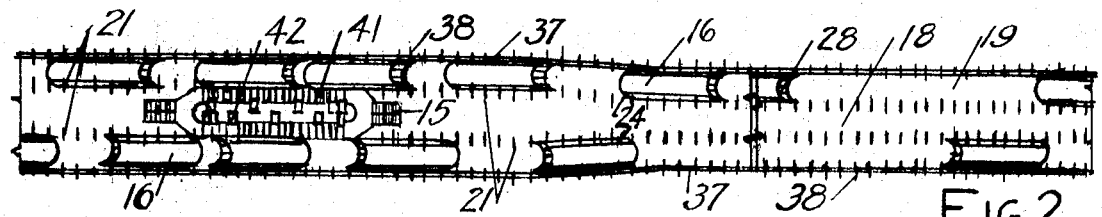
FIG. 2 shows schematically vehicles spaced at and between stations.

The public transit routes comprise pairs of roads 19 looped preferably in the maintenance buildings 17 and having a propulsion aisle 18 therebetween. (FIGS. 1–2). Vehicles 16 on routes 11 and 12 of substantial speeds, are trains of coupled cars spaced on roads 19 within a tunnel inclosure 20.

The propulsion system comprises a series of drives 21 closely spaced on a propulsion aisle 18 along road 19. The drives have friction wheels 22 powered by electric motors 23 directly or through gearing, each preferably at its preset speed. Each motor 23 is permanently connected to a power source through conventional controls including overload safeguards and automatic braking on power shutoff. Such electric propulsion avoids third rail or trolley power takeoff. Preferably, the mountings of the drives provide for their rotatability, resilient yield vertically within preset limits and adjustability of pressure of drive wheels 22 against exterior traction side members 24 of vehicle 16, particularly on rapid transit systems, for imparting drive impulses to the vehicles in zones of different speeds.

Figure 3:
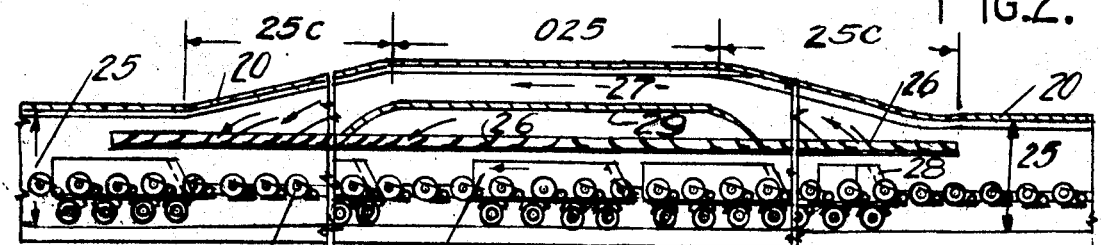
FIG. 3 is an elevation of vehicles operative at varying speeds within an aerodynamically improved enclosure.
Figures 4, 5:
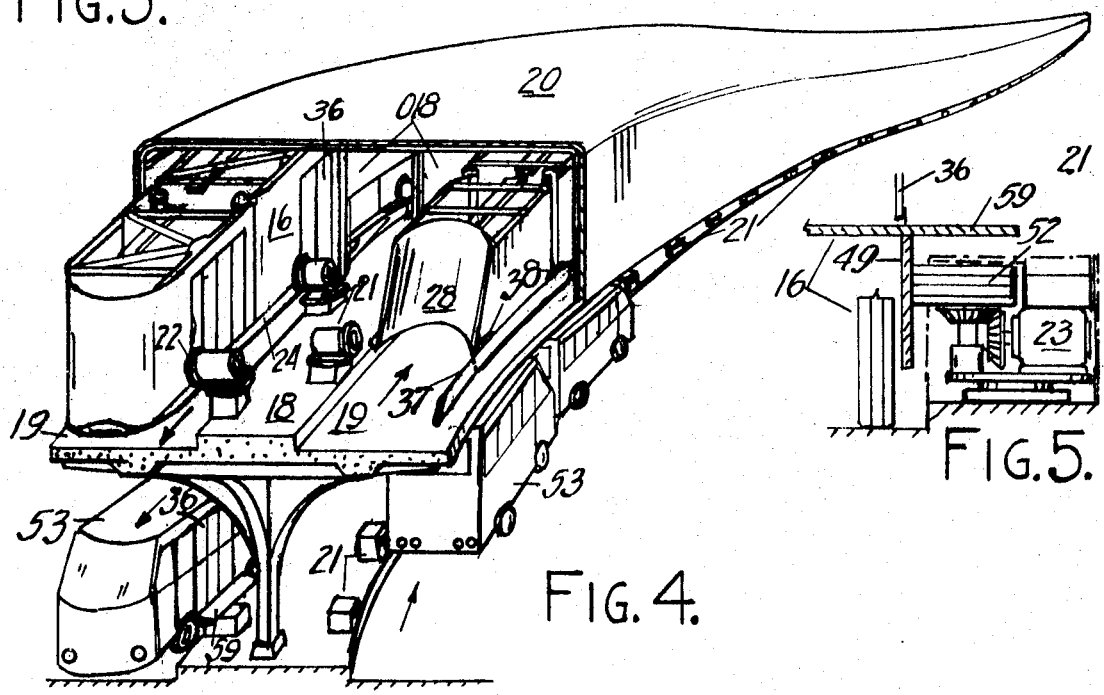
FIG. 4 shows in perspective an aerial enclosure revealing in part the novel system of rapid transportation also a system of dual propulsion of electric automotive buses as support of the rapid transportation system.
FIG. 5 is detail of a curbside bus drive shown in FIG. 4.

An aerodynamically improved enclosure 20, illustrated in FIGS. 3, 4 and 8, combines with the novel propulsion system to resolve the problem of air resistance in the different speed zones:
  a. In zones of closely spaced vehicles at minimum speed, as at stations, the inclosure portions are of maximum cross section 025.
  b. In zones of increasing, successive vehicle speeds, the inclosure section 25c varies decreasingly, as air from above and between the vehicles fill voids of lower air pressure behind accelerating vehicles.

c. The preponderant portions of the closed route within enclosure 20 have minimum cross sections 25 comprising the road 19, a ceiled roof and side of the inclosure and the inner partitioning 018 on columns in the propulsion lane 18, within zones of maximum speed of continuously moving spaced vehicles. The controlled airspace within which the vehicles are propelled with minimum frictional resistance by virtue of the proper airspace gradient between respective surfaces, causes the airmasses between the constant speed vehicles to move with the vehicles, thus avoiding head-on air resistance significantly.

d. In zones of decelerating vehicles, the cross sections 25c increase from the minimum 25 to maximum 025 and serve to divert part of the speeding airmasses from behind the slowing vehicles. To facilitate the air diversion, the vehicles 16 have troughed rear ends 28 streamlined at an acute angle. The sections 25c have a ceiled roof and intermediate ceiling 29 forming part of a duct 27 as means of bypassing surplus air from between the decelerating vehicles and the voids behind accelerating vehicles. Also, a framing of air-guiding vanes 26 extends above the roofless vehicles in the zones of changing speeds and the intermediate slow speed. The vanes 26 are communicative with the duct 27 and airspace above the vehicles in these zones, yet guide part of the airmasses between vehicles to and from the duct and airspace above the vanes without turbulence.

In the system of close headway between vehicles within enclosure 20, kinetic energy is stored gradually in the airmasses between vehicles as in the vehicles during vehicle acceleration at moderate rate, airmasses continuing to move with the vehicles without turbulence at the same, gradually increasing speed even to and at very high speeds. The energy stored in the airmasses is utilized efficiently in the bypassing system including the air duct 27 and the vanes 26 which are suitably formed to facilitate the egress of portions of the speeding airmasses from the 'urging,' gradually reduced spaces between slowing vehicles, also their egress from duct 27 to the increasing spaces between gradually accelerating vehicles. Continuity of airmass flow is significantly aided by air being drawn to fill the voids between the accelerating vehicles also by the high-speed air in duct 27 causing slower airmass to be drawn with it without turbulence. Accordingly, the novel enclosure 20 not only protects all facilities as well as passengers and assures uniformly high adhesion, but importantly, it achieves reduction of air resistance to virtual insignificance even at considerable vehicle speeds by a system structure that avoids turbulence and minimizes air pressure changes of significance.

The vehicle structure on public transit systems (FIGS. 4, 6, 8), enabling close headway and quick response to driving impulses; preferably comprises short trains 16 of several, or section unit lightweight cars having short platforms 30 with overlapping, curved, beveled ends on single-axle suspension mounted on rubber-tired wheels. Cars are interconnected pivotally by couplings of considerable resilient yield and provide very short turning radius within the enclosure 20. Lighting and air conditioning for each train is preferably provided by an electric battery powerpack whose capacity is maintained at par by an axle-driven electric generator. Platforms 30 have seats 32 perhaps adjacent the train side 33 also a tractional member 34 outward the side 33 and a tractional member 24 along the opposite edge outside the doors 36. The vehicle doors 36 are closed between stations and open while passing loading stations 14, enabling passengers to walk in or out the doors only during the period of slow train movement that is unitary with a movable train of platforms 41 to be described later. Successive, automatic opening and closing of the doors 36 are effected by cams 39 spaced at each station and serving to actuate a system of cam followers on the door-supporting posts by rotating these for opening and closing the door sections in proper timing.

Proper alignment of the series of drives 21 along the slightly cross-sloped roads 19, maintains lateral guidance of vehicles in operative relation between friction wheels 22 and the tractional surface 24 of each vehicle section. Further guidance is achievable by adjustable, longitudinal, inclined strength members 37 on preset structure anchored in runways 19 with the bottom edge of guide 37 slightly above the declining edge 34. Spaced idlers 38 are journaled resiliently in the members 37 and protrude below the bottom edge thereof in operative contact with surface 34. Thus, the three-dimensional guide means 37—38—34 serves protectively against lateral and vertical displacement of vehicles 16 on the runways 19 beyond allowable tolerance, yet permits taking advantage of the preferred light vehicles to maintain their automatic movement safely at desirable speeds that may be sufficiently high to lift the vehicles slightly within preset limits.

Substantially continuous loading and unloading as a valuable attainment, is effected by vehicles following one another in immediate continual succession while passing stations at practical minimum headway. The cycle of vehicle movement includes (a) deceleration from full running speed, (b) slow station speed and (c) acceleration to maximum speed, each succeeding vehicle consuming the same number of seconds; the timing including a pair of the vehicles being propelled at the same slow station speed, up to perhaps 10 seconds spacing, during the period of loading/unloading at each station.

A further important attainment is that the continuous loading and unloading at stations is effected by passenger transfer at adjusted speed in a process of continual succession. Initial and final transfer between pedestrian movement on a stationary landing and continuous passenger transport utilizes the well-proved and publicly accepted principle of the continuous low-speed belt or escalator step, but this is followed through to effect gradual adjustment of passenger speed between each slow vehicle while it passes a station and the stationary landings for entrance and for exit.

In the preferred embodiment of the loading system on stations 14, an endless train of short, interconnected platforms 41 on resilient wheel mountings, communicates operatively with landings 40 at each end of a station and in operative relation with trains 16. The train of platforms 41 is movable continuously in the station area, being propelled by drives 42 at the low station speed of the trains 16.

The outer ends of the series of station platforms 41 are beneath the edges of the traction members 24 of trains 16. Pending their contacting relation, runway 19 dips the train cars to slightly lower elevation, whereby train platform 30 and station platforms 41 become integral and move together at the train-loading speed during the period of contact, the station drives 42 maintaining the speed of the unitary platform. All doors 36 that are above the unitary platform, are open to provide safe, convenient and speedy transfer of passengers off and on the trains 16. The successive, automatic opening and closing of the train doors are effected by cams 39 (FIG. 8) near each end of the lowered portion of runway 19, engaging cam followers 039, door opening being timed after contact of the platforms 30/41 and door closing timed prior to breaking of contact.

To attain the desirable seating capability under continuous loading-unloading on the order of about 10,000 passenger seats in each hour of operation, a 6 f.p.s. speed of the unitary platform 30/41 is adequate. The structure for effecting passenger transfer to and from this speed from and to landings 40, is shown in FIGS. 6 and 8. Interconnected pairs of telescoping platforms 41 are contractable when propelled at perhaps 3 f.p.s. at each landing 40 and are extended when propelled at about 6 f.p.s. (approximately 4 m.p.h.) between the landings. In such structure, the taller of each pair of platforms 41 preferably has a grooved raised portion with a handrail 44. This is the equivalent of an escalator step. Passengers are taught to hold the handrail in stepping from the landing platform 40 onto the emerging grooved platform 41. They do so also after stepping from the train onto the integral platform for transfer onto the exit landing 40.

An alternate loading system (FIG. 7) suitable for greater, perhaps 25,000 or larger passenger seat transport capability in each hour of operation, introduces an intermediate speed-adjusting transfer means 43 between the landings 40 and unitary platform 30/41. In such system, a continual succession of independent stands 45 of equal length to platforms 41 and having handrails 44, are transferable on the transfer devices 43 prior to and after these ride on the unitary platform. Device 43 on wheels 47 takes power of moving platforms 41, serving to rotate groups of rollers 46 on support 43 progressively faster or slower, thereby transferring stands 45 between 3 f.p.s. and perhaps 12–15 f.p.s. to and from the 8–10 m.p.h. unitary platform. This load transfer system for loading stations is an application of the invention described in U.S. Pat. No. 3,136,266.

Important criteria of efficient urban transportation are net effective speeds (NES) rather than maximum running speeds, particularly at higher speeds. Thus, to attain 200 m.p.h. NES by conventional transportation, the running speed must be 300 m.p.h. if headway is kept to 12 minutes on a run of 300 miles of 6 stations and 2½m.p.h./s acceleration. In contrast, the disclosed automatic system of continuous loading and transport attains the same 200 m.p.h. NES under the same conditions at a maximum running speed of only 225 m.p.h. i.e. its NES/MAX. speed ratio is 89 percent at perhaps 10-second headway vs. 67 percent at 12-minute headway for the conventional systems.

Regardless of the speed, vehicle acceleration '$a$' of constant rate by the novel propulsion system imparting successive impulses of increasing frequency in groups per unit of time, enables drives of uniform low capacity and of uniform short spacing to provide the low incremental driving power '$P$' that varies directly as the speed '$v$.' For $P = E/T = \frac{1}{2}Mv \cdot v/t = \frac{1}{2}Mva$. The aerodynamically improved enclosure for the vehicles and their propulsion means avoids power increase as the cube of the speed needed additionally to overcome air resistance in conventional systems, by reducing air resistance to virtual insignificance through control of confined airmass movement without turbulence and with insignificant pressure change.

The aerodynamic enclosure, the novel propulsion means of limited resilient yield and use of lightweight vehicles within three-dimensional guide means combine to cause traction to shift automatically from vehicle wheels-on-road to drive wheels-on-traction members of the vehicles when adequately high speeds are reached and maintained, then to shift back automatically when speeds are again reduced. Such shifting is made possible in a substantial range of speeds by taking advantage of the relatively stationary airmass below the vehicle platforms during movement of vehicles and the airmasses between vehicles at substantial speeds. The curving of the vehicle platform lead end upward and inclining its bottom surface slightly enhance the tendency of the vehicle to lift off the road at lower than very high speeds. The lift is within preset limits of the resilient yield of the drives. In consequence, the vehicle tires are not subjected to overheating and as indicated hereinabove, also the drive wheels have very short drive periods with relatively substantial periods of no load operation particularly at the higher speeds. Hence, floating high-speed trains are practical and desirable.

Accordingly, the disclosed system is feasible and efficient. Supporting local transportation may be a more moderate speed version of an aerial or subway city transit in routes of closely spaced stations perhaps on the order of one quarter mile. However, for short trips particularly, the public prefers street level transit and in centers of business activity, the aerial structure appears objectionable to business, while subways are too costly for this.

The conventional intermittent city street bus has failing characteristics including substantial contribution to urban air pollution. Hence, its replacement is necessary by all-electric city street transit that must nevertheless be capable of traveling as and where necessary without interruption throughout the operating day. Electric battery power of optimum advance in the foreseeable future, is at best limited in speed, vehicle load and duration of propulsion before recharging becomes necessary. Therefore, reliance on electric battery power itself is considered impractical, particularly if lower annual transportation cost is a valued criterion.

Figure 12:
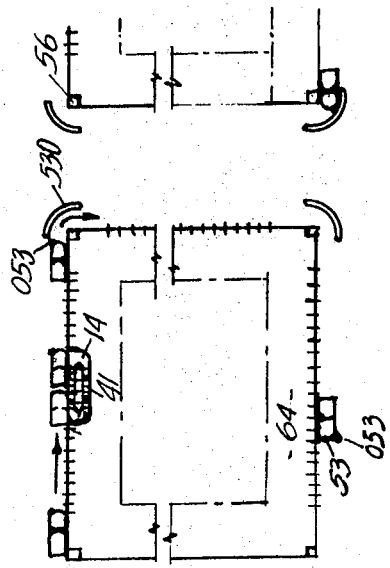
FIG. 12 is schematic of a city street electric automotive bus system.
Figure 13:
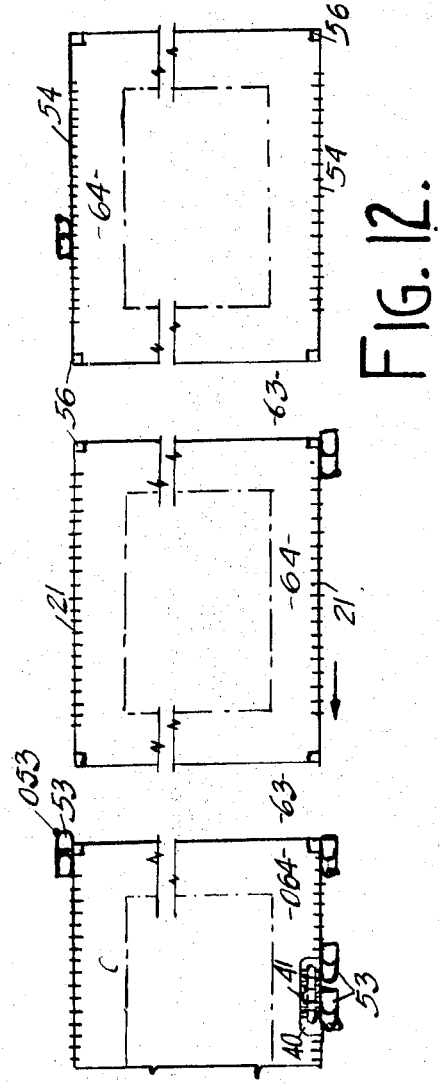
FIG. 13 illustrates in perspective a city street bus station in FIG. 12.
Figure 14:
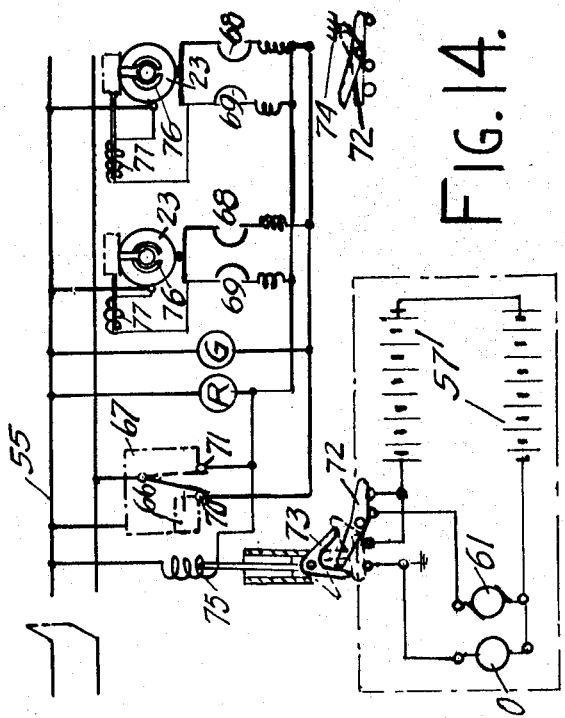
FIG. 14 is an electric diagram for electric automotive bus transit.

The dual electric system of vehicle propulsion combines:
a. Electric, stored power, automotive means applicable for short duration runs at low to moderate speeds;
b. The external, automatic, roadside drive system of vehicle propulsion applicable on longer runs at higher speeds and
c. Means of automatically recharging the electric battery of each vehicle during and by virtue of the roadside vehicle propulsion. This combination results in further advance in the art of transportation not only as applied to city street public transit but to motor vehicles generally and more particularly to passenger auto propulsion within urban areas. For therein is the promise of eliminating or at least assurance of substantial reduction of the affliction of air pollution that is caused by the internal combustion engine embodied in massed concentration of vehicles in urban areas. Obviously, the simple combination of (a), (b) and (c) possesses the feasibility of immediate, gradual or crash application of dual electric propulsion to halt the serious increase of noxious fumes and incidence of smog in several large centers of population. FIGS. 9, 10 and 11 illustrate dual-propelled buses and private automobiles on a highway and FIGS. 12, 13 and 14 illustrate automotive transit on city streets.

Adaptation of passenger vehicles for dual, electric propulsion may include the lead acid battery as the electric automotive power,—a well-known art. The limited capacity battery installation in vehicle 50 for local propulsion perhaps for most part of 1 hour at 50 feet per second, is not expected to exceed the weight of the substituted conventional internal combustion engine and accessory equipment even for heavier cars. Higher energy density batteries that appear to be practical, should enable decrease in the vehicle weight, yet provide adequate propulsion on city streets for local runs of short to moderate duration.

To extend the scope of operation of the electric automobile, to attain desirable highway speeds for long duration and substantial distance, yet air pollution and road hazards, the electric automotive vehicle is combined with automatic, electric roadside propulsion systems which comprise a series of stationary drives 21 spaced operatively alongside a road having vehicles 50, 53 adapted for such propulsion, and serving to impart these vehicles successive drive impulses from the side thereof at constant or variable speeds as preset, substantially on the order of propulsion system for rapid transit as described. With suitably close drive spacing, every vehicle in succession would be propelled by one or more drives, the same series of drives being capable of propelling numerous vehicles in succession at desirable highway speeds in the course of each operating day.

A sectional, resiliently self-adjusting tractional member 49 is secured at each side of each vehicle 50, preferably rearward of the front wheels and below the doors. Each tractional surface 49 is preferably vertical and the automobile 50 is urged by the lateral slope of the crowned road also by control of the motorist, to maintain contact with spaced, preferably vertical axis propulsion wheels 52 that are aligned in closely spaced relation. This assures easy, positive vehicle alignment for operative contact of tractional member 49 with the driving wheels 52 that are activated through suitable gearing by electric motor 23. An axle-driven electric generator serves to recharge the auto battery automatically during the roadside propulsion of each vehicle 50, as part of the combination. Member 49 has its rear section retained resiliently in telescoping relation with the fixed forward section for yield when drive wheels of slightly different speeds propel both sections simultaneously.

In FIGS. 9 and 10, dual electric propulsion of vehicles on highway 10 comprises outer and inner lanes 19, automotive service roads 48 between the lanes, also propulsion aisles 18 in which drives 21 are spaced in operative relation to vehicles on the adjoining lanes 19. The outer lanes 19 are preferably reserved for electric buses 53 also for electric commercial vehicles such as light city delivery vans; the inner lanes 19 serving electric automobiles 50.

Crossing the highway as an overpass, though it may be an underpass, is a vehicle route representing the extended end of a business center street 13B in FIG. 1. The crossing communicates with automotive service roads 48 on the highway by means of interchange ramps 51. Arrows in FIG. 10, indicate direction of vehicle movement at and near the interchange, this movement being automotive on lanes 48 and 13B. Through lanes 19 are preferably depressed at the crossing so that ramps 51 need be elevated but little in aligning with the crossing. Service roads 48 also, serve as emergency lanes should a vehicles in either of adjoining lanes develop defect. For by steering the vehicle away from drives 21, it can be transferred onto the adjoining service road at any point for slower automotive movement to interchange or to be hauled off the highway without disturbing the automatic highway speed traffic on the vehicle lanes 19.

The motorist controls his electric motor vehicle even when taking advantage of the automatic roadside electric propulsion by aligning the vehicle and keeping it aligned via the preferably vertical traction member 49 against the horizontal drive wheels 52. These accelerate the vehicle beyond the optimum automotive speed to desirable highway speed then back to near automotive speed at each interchange. The drives 21 also provide the power during roadside propulsion to regenerate stored automotive electric power to par.

Similarly, the vertical traction member 49A on each bus 53 is alignable in operative contact with roadside propulsion wheels 52 alongside outer lanes 19 for bus acceleration to preset highway speed and deceleration to automotive speed. Just before to beyond bypass spurs 62 off lanes 19 at crossings such as 13B, a gap in the drives requires automotive operation at the interchange for offroad loading at stations on spurs 62. This permits suitable speed operation of through vehicles. Continuous passenger transfer is made available by electric stairs 15 to and from stations 14 on the crossings. Hence, this system achieves efficient bus and auto operation and improved utilization of highways besides avoiding air pollution as well as highway hazards common with vehicle transportation.

Dual electric propulsion is applicable practically for city street public transit on short runs, as on metropolitan highways such as road 10 and for support of rapid transit having infrequent stations. Notwithstanding the frequency of crossing streets and the regulated intermittent traffic, the electric automotive bus 53 on city streets combines with the automatic curbside propulsion system and an interlocked progressive traffic light system to operate continuously in an exclusive lane along the street curbing to provide safe, continuous transportation without air pollution yet on a self-liquidating, economical basis of a fully automatic system.

In the embodiment of this system, buses 53 cross streets 63 under electric, automotive power either automatically or by bus operator control. They are propelled along curbing 54 of city blocks 64 by external electric curbside drives 21. The driving motors 23 are connected to power mains 55 through suitable controls and are electrically interlocked with a progressive traffic light system 56. Operation of buses 53 is at varying speeds in a route that includes frequently spaced stations passed by the buses 53 at slow speed during which loading and unloading of passengers is effected in a process of continual succession of desired.

To minimize axle load and to attain optimum flexibility with short turning radius, the bus is compact, accommodating perhaps a dozen passengers. For operator-controlled operation, two or more coupled units would minimize cost. The buses have conventional chassis for electric automotive operation and walk-in-type bodies with wide side doors permitting rapid movement of passengers in or out. Just below the side doors 36, an extension of the bus platform forms a loading platform 59. A vertical traction member 49A extends below the loading platform 59 and is similar to member 49 on dual propulsion automobiles in structure, function and position relative to doors 36. If the bus is designed for both highway and city street propulsion, the vertical traction member 49A is deeper with its bottom edge at the same elevation as member 49 on automobiles. Thereby, both roadside and curbside drive wheels 52 can propel the bus although the drives are at different elevations.

The electric bus system and characters of reference thereto are shown in FIGS. 12, 13 and 14 applicable to street transit particularly.

Each section of every bus 53 has a set of electric batteries 57 that are preferably supported accessibly beneath bus platform 58. The automotive plant includes also electric motor 60, preferably for conventional rear end drive and an axle drive generator 61 for recharging the batteries 57 which may include a powerpack that provides light and air conditioning for the bus. Each powerplant is connected for lead car operation automatically or by an operator. Relatively small power is required to drive the bus by electric motors 60 for effecting crossings in 1 or 2 seconds each. However, bus propulsion by drives 21 along each city block 64 is considerably longer. Therefore, the axle-driven generators 61 on buses 53 are enabled to regenerate within each block 64 practically all power consumed in crossing each street 63. Accordingly, bus operation can be continuous throughout the day every day, without generating air pollution and more efficiently by being continuous and therefore requiring much less maintenance. Of importance also is that transportation per passenger-mile is less costly by electric utility power than by burning fuel in internal combustion engines.

A process of continual loading/unloading is effected as pairs of buses 53 follow each other in immediate succession past each station 14 at preset minimum speed. The embodiment of the loading system is substantially as described for rapid transit but modified to simpler structure that meets the needs of considerably lower transport capacity and therefore lower station speed. The interconnected, endless series of station platforms 41 are propelled by station drives 42 at about the speed—2½ f.p.s. to 3 f.p.s.—of the conventional escalator step. This enables passengers to transfer between moving platforms 41 and the stationary landings 40 directly without any intermediate speed-adjusting device. Upon approaching each station, the bus 53 is slowed to 3—f.p.s. minimum speed and is elevated slightly on ramp 65 then dipped to make contact between loading platform 59 and platforms 41, thereby forming a unitary slow-moving transfer platform at the station for safe loading during the interval doors 36 of the bus are open for that purpose.

The doors 36 above each loading member 5 are opened automatically after that loading member had formed an unitary platform with station platforms 41. They are closed just prior to the termination of the contacting relation. The opening and closing of the doors are effected either by cams 39 as on the rapid transit system or by electric motorized means actuated by battery power. The interval between the opening and closing of the doors 36 can be made adequate for passenger loading and unloading, 10-second duration of each open door at 3 f.p.s. being achieved in 30 feet of unitary platform.

Every station 14 including the unitary platform and the entrance and exit landings 40, requires but a small part of the sidewalk, preferably central of the station block 064. The drives 21 between the station and the rear end of the station block, operate at progressively slower speeds to minimum at the station and similarly forward of the station, at progressively faster speeds from minimum to perhaps half speed near the forward end of the same block. Hence, the crossing of streets 63 to and from the station blocks 064, is effected at perhaps half the maximum bus operating speed automatically as preset for the electric automotive bus 53. A reasonable maximum city street speed of buses 53 along the curbing 54 is preferably on the order of 50 f.p.s., the speeds from and to which are effected gradually on the preceding and following blocks 64 respectively. Accordingly, depending upon station spacing on the order of one-fifth or one-fourth or one-third mile, the net effective speed reaches 12 m.p.h. to 15 m.p.h., which is higher than prevailing bus speeds on routes of equal station spacing on city streets.

As in previously described continuous public transportation systems, between successive stations, the cycle of operation includes a. maximum interstation speed which is followed in succession by
b. decelerating speed to minimum station speed at efficient rate;
c. minimum station speed in the same headway timing of vehicles as in decelerating;
d. accelerating speed between (c) and (a) at the same rate and vehicle headway timing as in (b).

By virtue of the roadside propulsion system herein and the above cycle between stations, equal headway timing of vehicular deceleration and their movement past a station 14 are preset to cause the deceleration to terminate a desirably short distance behind the loading vehicle, so that these vehicles follow one another at insignificant gap in passing the station to achieve practically continuous loading and unloading. By applying such cycle to city street bus operation on ¼-mile station spacing, the time consumed by a bus 53 in a station block 064 even of moderate length, is greater than in the remaining several blocks between the stations. For on these several blocks, buses move at the highest speeds in the cycle and include maximum interstation speed plus the remaining slow down and speed up at the higher speeds.

Proper utilization of these factors can readily coordinate timing of traffic light changes with timing of the cycles and of bus movement at the different speeds, whereby the traffic light at any corner is green at the time a bus at such corner is ready to cross the thoroughfare. The green light is set as conventionally to alternate at desirable preset intervals and the color changes at suitable intervals progressively at successive crossings. Pursuant to the electric interlock by which traffic lights and drive motors are coordinated, the propulsion motors operate continuously under normal torque conditions through the two light intervals by virtue of the progressive timing of the lights.

In the electrical diagram in FIG. 14, traffic lights R and G respectively for red and green, are connected in parallel to the power mains 55 through a relay switch 66 that is actuated by a timer 67 which effects alternate closing of one circuit while opening the other. The drive motors 23 with parallel circuit breakers 68 and 69 are connected also to the power mains 55 and onto the traffic light circuit at 70 and 71. Whereas the automotive powerplant may be operative conventionally by an operator, operation of the buses 53 is preferably effected automatically by electrical interlock of the battery 57 with the traffic light circuits R and G to insure that the buses commence their crossings only on green light.

On every bus 53, a battery switch connection 72 is mounted on the underside of each bus-loading platform 59. The switch is closed by a cam 73 that is mounted in operative relation to it in a suitable forward portion of every block. It is opened by a fixed cam 74 at rear end of every block. When the switch connection 72 is in closed position after actuation by cam 73, the motor 60 in the closed battery circuit proceeds to propel the bus, then after the crossing, cam 74 opens switch connection 72 as the motor drive 21 takes over. The cam 73 is removable from operative relation with switch connection 72 by a solenoid 75 that is connected in the red light circuit. Thus, in the unusual event that the red light turns on as the bus along the curbing approaches the corner, solenoid 75 is energized, thereby preventing the closing of the battery circuit. When the green light goes on, solenoid 75 is deenergized, enabling motor 60 to propel the bus safely on the 1 sec. to 2 sec. crossing.

For emergencies such as overloading or malfunction upsetting coordination or that requires manual operation of traffic lights, circuit breaker 68 is preset to trip on overload above allowable maximum torque during the green light and circuit breaker 69 is set for minimum torque that may be applicable by the lead car of a bus when the relay switch 66 closes the red light circuit. Then if traction member 49A imposes load by contacting drive wheel 22 near the traffic light during the red light interval, the motor drive circuit is interrupted. When either circuit breaker is tripped, deenergized solenoid 77 and spring action of brake 76 on the drum of wheel 22, cause quick stoppage of the motor and bus.

A tripped circuit breaker is closed manually when departure is corrected. Such device is rendered in conjunction with continual checking, servicing and general maintenance of the equipment by the continual presence of suitable personnel.

This practical, safe and convenient city street transit system attains higher transportation efficiency and economy of operation. For by virtue of an all electric dual propulsion system, it offers ever-ready availability by continuous loading, transport and unloading and relatively higher net effective speeds. Its closely spaced stations connecting with public rapid transit stations for continuous transfer, enable it to provide effective support for the rapid transit systems having 1-mile or greater station spacing. Immeasurably important is that unlike conventional buses, it does not pollute the air and endanger centers of high population density.

In summary, a practical solution is offered to prevailing urban transportation problems—e.g. traffic congestion, air pollution and the increasing highway accidents. These problems are resolved through the medium of all electric, high-efficiency systems of continuous transportation encompassing nearly all categories of public and private transportation.

The following practical improvements enable the attainment of high-efficiency transportation basically in a range of systems from city streets speeds to rapid transit and high-speed transportation as high as 300 m.p.h. at which vehicles operate 'floatingly':

1. Continuous vehicle propulsion is revealed to be most efficient in cycles of minimum to maximum to minimum speeds. Dependable continuity of vehicle movement is achieved by a novel system of roadside propulsion that is ever accessible for servicing, direct connected to electric power mains for continuous, lowest cost power and serving to impart successive drive impulses at suitably different frequencies externally to successive vehicles in the route. Significant economy and dependability is attained as every installation is capable of imparting the impulses propelling many vehicles every day at correspondingly variable speeds as desired in succession.

2. The necessarily limited operative capability of electric automotive vehicles is overcome effectively to desirable operative capability by combining electric automotive propulsion with the externally controlled, roadside, electric propulsion of the vehicles on highways. The resulting dual electric propulsion system enables freedom of vehicle movement at city street speeds under motorist control, automatic vehicle propulsion on highways, all without air pollution in and about the city, plus automatic regeneration of the automotive power during the roadside propulsion.

This insures that vehicles of very limited automotive capacity nevertheless function at the same optimum allowable highway speeds with all other vehicles in succession. Both the incentive and capability to tailgate, get out of line to pass etc. are inherently removed so that accidents on the highway are avoided automatically. The dual electric propulsion system is applicable practically and desirably for all-electric street and highway auto-bus operation particularly with the improvement of a system of continuous loading as well as transport. Also, guided transit vehicles can, if so provided, be switched readily into and out of the route.

3. Treated conventionally, air resistance becomes increasingly formidable at the higher speeds because the power required to overcome air resistance during vehicle acceleration increases as the cube of the speed and must be maintained during the maximum speed. Hence improvement is embodied in an aerodynamic enclosure of suitably varying cross section for transportation systems. The aerodynamic enclosure virtually eliminates most air resistance automatically by maintaining the suitably confined airmasses between the spaced vehicles at practically uniform, low pressure throughout the closed route of varying speeds. Further improvement in combination, virtually avoids air turbulence.

Thereby, practical, automatically controllable operation at any suitably high speeds becomes readily attainable economically. Indeed, speed variation of successive 'light' vehicles to and from speeds as high as 300 m.p.h. is feasible as traction shifts gradually and automatically between the vehicle wheels on the ground and the resilient retention of the 'floating' vehicles against closely spaced driving wheels, propelling these in a preset route without significant pressure of the air confined within the aerodynamic enclosure.

4. Integration by continuous transfer means is effected between nearby loading stations of the several competitive and coordinating public transportation systems, each of which provides continuous loading, transport and unloading. Such integration results in a comprehensive transportation system offering optimum net effective speeds with immediate availability of transportation between any stations in the entire system even between distant electric bus stations. The foregoing and other improvements and features attain high efficiency of transportation and of operation.

The foregoing description including the drawing forming part thereof, is intended to be illustrative by way of example of suitable embodiments and that the invention not be limited thereto except as the claims set forth hereinafter are so limited. For many modifications and variations serving for the automatic transportation not only of passengers but also of packages and other freight as well as other applications, may be made without departing from the scope of the invention.

I claim:

1. In a transportation system, the combination of: a road, a plurality of vehicles thereon and driving means spaced on the side edge of the road for continuous external vehicle propulsion, said vehicles have exterior traction members generally parallel to the road lengthwise of the vehicles, said driving means are arranged to apply downward components of pressure to said traction members, directed toward the road, said driving means are operative at the same and substantially different preset speeds for imparting successive individual impulses continuously to each successive vehicle at progressively faster or slower impulse frequencies and said driving means being arranged to provide zones of different, widely ranging vehicle speeds.

2. In a transportation system according to claim 1, including a system of continuous loading of vehicles comprising loading stations in zones of minimum vehicle speed, the drives serving to propel vehicles on closely timed uniform headway to and from loading stations, each station having apparatus for transferring articles at a plurality of speeds to and from vehicles at the station and means of timing vehicles past loading stations in pairs at the same preset loading speed for transport capacity to vary with the speed.

3. In a transportation system according to claim 1, including a road enclosure of changing cross section varying generally inversely to vehicle speeds in the direction of vehicle movement therewithin, the vehicles propelled on closely timed headway, serving to move airmasses between vehicles therewith and means of airflow communication among airmasses between vehicles.

4. In a transportation system according to claim 3, including an air bypass duct in each portion of the enclosure of maximum cross section in zones of lowest vehicle speeds, each end of each duct communicative with airmasses between vehicles movable in zones of changing speeds for airflow communication toward lower pressure among the airmasses between vehicles.

5. In a transportation system according to claim 4, including continuous loading systems disposed alongside the road in portions of the enclosure of maximum cross section, an air bypass duct in each of the same enclosure portions and means at either end of each duct in zones of changing vehicle speeds, for guiding airflow from airmasses between decelerating vehicles movable toward the loading systems, through the bypass ducts and toward airmasses of lower pressure between accelerating vehicles.

6. In a transportation system according to claim 1, including vehicles both operative automotively to and from the edge-powered road and having the exterior traction members cooperative with the electric-powered drives above the edge of the road, a cross slope of the road declining toward the drive edge to guidingly maintain vehicles operatively aligned with the drives at all preset operative speeds.

7. In a transportation system according to claim 1, including automotive vehicles of limited electric battery power and speed, exterior traction members thereof adapted operatively to the electric drives above the edge of the road and means powered from vehicle axles during external propulsion thereof, of recharging the batteries of the automotive vehicles for achieving all-electric vehicle propulsion in an increased range of speeds beyond electric automotive capability.

8. In a a transportation system according to claim 1, including a plurality of friction wheels adapted to impart successive driving impulses to the vehicles, each vehicle further comprising a plurality of traction member sections mounted for resiliently yielding, longitudinal relative displacement during simultaneous application of impulses of different frequencies to the traction sections.

9. In a transportation system, the combination of: a road, a plurality of spaced vehicles thereon, exterior traction fins lengthwise of said vehicles and having preset cross slopes to the road at either side of said vehicles, driving means for propelling said vehicles in succession on the road and a plurality of friction wheels mounted for resilient yield and spaced along the road on opposite sides of said vehicles, said friction wheels being disposed operatively with said traction fins and arranged to apply downward pressure thereto and components of said pressure being directed laterally and downward toward the road to guide said vehicles and to maintain traction in a wide range of vehicle speeds.

10. In a transportation system according to claim 9, the combination including said driving means guidingly propelling said vehicles on closely timed headway to and forward to facilitate buoyant vehicle lift during said vehicle propulsion, traction for vehicle propulsion being maintained by vehicle wheels on road during vehicle movement below high speeds and by said traction fins against said friction wheels in the range of high speeds.

11. In a transportation system according to claim 1, including a loading station, an endless train of station platforms, meaNs of moving said platforms at vehicle-loading speed, means of interlocking successive vehicles with said platforms to form a temporary unitary loading platform and means of transferring load units at a plurality of faster and slower speeds to and from said unitary loading platform, pairs of vehicle on closely timed headway being arranged to move in succession for simultaneous loading and unloading.

UNITED STATES PATENT OFFICE
CERTIFICATE OF CORRECTION

Patent No. 3,613,599                    Dated October 19, 1972

Inventor(s)  Solomon F. Seidman

It is certified that error appears in the above-identified patent and that said Letters Patent are hereby corrected as shown below:

Title page, line 2, correct - "2021 Meridian Ave." to "1470 16 Street,".

Column 5, lines 54-55, correct - "short trains 16 of several,or section unit lightweight cars" to - "short train 16 of several lightweight cars or section units".

Column 5, line 6, correct "lane" to "aisle".

Column 8, line 41, insert "avoid" after "yet".

Column 9, line 15, correct "a vehicles" to "a vehicle".

Column 11, line 19, correct "vehicular" to "vehicles during".

Column 14, Claim 11, line 3, correct "meaNs" to "means".

Column 14, Claim 10, line 3, between "and" and "forward" insert omitted portion --"from high speeds and the underside of said vehicles inclined".

Signed and sealed this 19th day of September 1972.

(SEAL)
Attest:

EDWARD M. FLETCHER, JR.                  ROBERT GOTTSCHALK
Attesting Officer                         Commissioner of Patents